(12) United States Patent
Katakura et al.

(10) Patent No.: US 7,411,741 B2
(45) Date of Patent: Aug. 12, 2008

(54) ZOOM LENS SYSTEM INCLUDING REFLECTIVE SURFACE WHICH REFLECTS OPTICAL PATH AND IMAGE PICKUP APPARATUS INCLUDING THE SYSTEM

(75) Inventors: Masahiro Katakura, Hino (JP); Eiji Shirota, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/900,718

(22) Filed: Sep. 12, 2007

(65) Prior Publication Data

US 2008/0080063 A1  Apr. 3, 2008

(30) Foreign Application Priority Data

Sep. 28, 2006  (JP) .............. 2006-264542

(51) Int. Cl.
*G02B 15/14* (2006.01)
(52) U.S. Cl. ..................... 359/687; 359/684
(58) Field of Classification Search ............. 359/683, 359/684, 687
See application file for complete search history.

(56) References Cited

U.S. PATENT DOCUMENTS

| | | | |
|---|---|---|---|
| 6,771,432 B2 | 8/2004 | Mihara | |
| 6,975,462 B2 | 12/2005 | Mihara | |
| 7,145,730 B2 | 12/2006 | Mihara | |
| 7,286,299 B2* | 10/2007 | Matsui | 359/687 |
| 7,315,423 B2* | 1/2008 | Sato | 359/687 |
| 2003/0193722 A1 | 10/2003 | Mihara | |
| 2005/0002115 A1 | 1/2005 | Mihara | |
| 2006/0018032 A1 | 1/2006 | Mihara | |
| 2006/0268427 A1 | 11/2006 | Mihara | |

FOREIGN PATENT DOCUMENTS

JP  2003-302576  10/2003

* cited by examiner

*Primary Examiner*—Scott J Sugarman
(74) *Attorney, Agent, or Firm*—Kenyon & Kenyon LLP (57) ABSTRACT

There is disclosed a zoom lens system including, in order from an object side, a first lens unit having a positive refractive power, a second lens unit having a negative refractive power, a third lens unit having a positive refractive power and a fourth lens unit having a positive refractive power, and further including an aperture stop S disposed between the second lens unit and the third lens unit, during zooming from a wide-angle end to a telephoto end, a space between the lens units is changed, the first lens unit includes a single lens having a negative refractive power, a reflective optical element having a reflective surface which reflects an optical path and a sub unit having a positive refractive power, and the zoom lens system satisfies predetermined conditions.

13 Claims, 10 Drawing Sheets

ZOOM LENS SYSTEM INCLUDING REFLECTIVE SURFACE WHICH REFLECTS OPTICAL PATH AND IMAGE PICKUP APPARATUS INCLUDING THE SYSTEM

CROSS REFERENCE TO RELATED APPLICATIONS

This application claims benefit under 35 U.S.C. §119 of Japanese patent application of No. 2006-264,542 filed in Japan on Sep. 28, 2006, the contents of which are incorporated herein by reference.

BACKGROUND OF THE INVENTION

1. Field of the Invention

The present invention relates to a zoom lens system including a reflective surface which reflects an optical path and an image pickup apparatus including the zoom lens system.

2. Description of the Related Art

As a zoom lens system preferable for use together with an electronic image pickup device such as a CCD image sensor or a CMOS type image sensor, a zoom lens system described in Japanese Patent Application Laid-Open No. 2003-302576 is known. This zoom lens system includes, in order from an object side, a first lens unit having a positive refractive power, a second lens unit having a negative refractive power, a third lens unit having a positive refractive power and a fourth lens unit having a positive refractive power. A prism having a reflective surface which reflects an optical path is arranged in the first lens unit to thin the zoom lens system in a thickness direction. The reflective surface is disposed in the first lens unit and a negative lens is disposed on the object side of the first lens unit, so that an angle of view is easily secured and the reflective surface is easily miniaturized.

BRIEF SUMMARY OF THE INVENTION

A zoom lens system according to the present invention comprises, in order from an object side, a first lens unit having a positive refractive power, a second lens unit having a negative refractive power, a third lens unit having a positive refractive power, a fourth lens unit having a positive refractive power, and an aperture stop disposed between the second lens unit and the third lens unit, during zooming from a wide-angle end to a telephoto end, each of spaces between the lens units which are arranged adjacent to each other being changed, the first lens unit comprising, in order from the object side, a negative lens as a single lens having a negative refractive power, a reflective optical element having a reflective surface which reflects an optical path, and a sub unit having a positive refractive power, the following conditions (1), (2) and (3) being satisfied:

$$n_{dL1} > 1.95 \quad (1);$$

$$v_{dL1} < 26 \quad (2); \text{ and}$$

$$0.5 < D_{13}/f_1 < 1.5 \quad (3),$$

in which $n_{dL1}$ is a refractive index of the negative lens of the first lens unit closest to the object side for the d-line, $v_{dL1}$ is the Abbe number of the negative lens of the first lens unit closest to the object side, $D_{13}$ is a distance along an optical axis between an image-side surface of the negative lens of the first lens unit closest to the object side and an object-side surface of the sub unit having the positive refractive power, and $f_1$ is a focal length of the first lens unit.

Moreover, an electronic image pickup apparatus according to the present invention includes the zoom lens system according to the present invention, and an electronic image pickup device which is disposed on an image side of the zoom lens system and which converts an optical image into an electric signal.

Other features and advantages of the present invention will become apparent from the following detailed description of the embodiments when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 1A to 1C are sectional views of Example 1 of a zoom lens system including an optical axis according to the present invention when focused at infinity.

FIGS. 2A to 2C are sectional views of Example 2 of the zoom lens system including the optical axis according to the present invention when focused at infinity.

FIGS. 3A to 3C are sectional views of Example 3 of the zoom lens system including the optical axis according to the present invention when focused at infinity.

FIGS. 4A to 4C are aberration diagrams of Example 1 of the zoom lens system according to the present invention when focused at infinity, showing a spherical aberration (SA), an astigmatism (FC), a distortion (DT) and a chromatic aberration of magnification (CC)

FIGS. 5A to 5C are aberration diagrams of Example 2 of the zoom lens system according to the present invention when focused at infinity, showing a spherical aberration (SA), an astigmatism (FC), a distortion (DT) and a chromatic aberration of magnification (CC)

FIGS. 6A to 6C are aberration diagrams of Example 3 of the zoom lens system according to the present invention when focused at infinity, showing a spherical aberration (SA), an astigmatism (FC), a distortion (DT) and a chromatic aberration of magnification (CC)

DETAILED DESCRIPTION OF THE PREFERRED EMBODIMENTS

A zoom lens system according to the present invention comprises, in order from an object side, a first lens unit having a positive refractive power, a second lens unit having a negative refractive power, an aperture stop, a third lens unit having a positive refractive power and a fourth lens unit having a positive refractive power, and the first lens unit has a reflective optical element which reflects an optical path. According to such a constitution, since the optical path of the zoom lens system is bent by the reflective optical element, it is possible to reduce thickness of an image pickup apparatus using the zoom lens system. Moreover, the spaces which are changed during zooming from a wide-angle end to a telephoto end are positioned in the optical path reflected by the reflective surface. Therefore, the thickness of the image pickup apparatus may be thinned irrespective of the movement of the lens units for zooming.

In addition, a lens of the first lens unit closest to the object side is a single lens having a negative refractive power. Therefore, a projecting amount on the object side of the reflective surface may be reduced to that for only one lens.

On the other hand, in this negative lens, a ray height easily increases in the wide-angle end, and a chromatic aberration is easily generated in the vicinity of the telephoto end. Therefore, it is preferable to reduce axial and off-axial aberrations of this negative lens itself. The above conditions (1) and (2) define characteristics of a material of this negative lens so as to easily correct the aberrations of the negative lens itself and aberrations of a sub unit having a positive refractive power.

The condition (1) specifies a refractive index of the negative lens. If $n_{dL1}$ is below a lower limit of the condition (1), an absolute value of a curvature of each surface of the negative lens increases (an absolute value of a radius of curvature decreases), and various aberrations are easily generated.

The condition (2) specifies the Abbe number of the negative lens. If $v_{dL1}$ is above an upper limit of the condition (2), an amount of the chromatic aberrations to be generated in the negative lens itself is reduced, and a function of canceling the chromatic aberrations generated in the sub unit having the positive refractive power easily deteriorates.

The condition (3) specifies a distance along an optical axis between the negative lens and the sub unit having the positive refractive power, and the condition is a prerequisite in disposing the reflective surface to thin the zoom lens system.

If $D_{13}/f_1$ is below a lower limit of the condition (3), it is difficult to dispose the reflective surface which reflects the optical path.

If $D_{13}/f_1$ is above an upper limit of the condition (3), a thickness of the zoom lens system increases, and a diameter of the negative lens increases. This is unfavorable in securing the optical path.

It is to be noted that it is more preferable to set a lower limit value of the condition (1) to 1.99. It is further preferable to set an upper limit value to 2.3. If the value of the condition exceeds the upper limit value, the material easily becomes expensive.

Moreover, it is more preferable to set a lower limit value of the condition (2) to 15. If a value of the condition exceeds the lower limit, the material easily becomes expensive. It is more preferable to set an upper limit value to 25.5. In consequence, the above-mentioned effect can further be produced.

It is more preferable to set a lower limit value of the condition (3) to 0.7. It is further preferable to set an upper limit value to 1.2. In consequence, the above-mentioned effect can further be produced.

In the zoom lens system, it is preferable that the third lens unit includes, in order from the object side, a first positive lens, a second positive lens, and a cemented lens constituted by cementing a positive lens and a negative lens in order from the object side.

According to this constitution, a spherical aberration and an axial chromatic aberration can mainly satisfactorily be corrected. In a case where the reflective optical element which reflects the optical path is used in the first lens unit, the total length itself of the zoom lens system along the optical axis does not directly influence the thickness of the image pickup apparatus. Therefore, as compared with the zoom lens system which has a bended optical axis, miniaturization of the system is achieved even if the number of the lenses is increased.

According to the above-mentioned constitution of the third lens unit, the positive power required for the zooming is secured and the positive power is shared by three positive lenses. In consequence, various aberrations (especially, axial aberrations) can satisfactorily be corrected. When the third positive lens is cemented to the negative lens, a function of correcting the chromatic aberration can be secured. A principal point of the third lens unit is easily disposed close to the second lens unit. This constitution is advantageous in securing a zoom ratio.

Furthermore, it is preferable that the first positive lens and the second positive lens of the third lens unit satisfy the following conditions:

$$-0.95 < (R_2 + R_2)/(R_1 - R_2) < -0.5 \quad (4); \text{ and}$$

$$-0.3 < (R_3 + R_4)/(R_3 - R_4) < 0.3 \quad (5),$$

in which $R_1$ is a paraxial radius of curvature of an object-side surface of the first positive lens, $R_2$ is a paraxial radius of curvature an image-side surface of the first positive lens, $R_3$ is a paraxial radius of curvature of an object-side surface of the second positive lens, and $R_4$ is a paraxial radius of curvature of an image-side surface of the second positive lens.

To satisfactorily correct the axial aberration, it is preferable that the first positive lens closest to the object side and the second positive lens in the third lens unit disposed immediately after the aperture stop simultaneously satisfy the conditions (4) and (5).

The condition (4) is a condition concerning a shape of the first positive lens through which a ray passed through the aperture stop first enters. When the $(R_1+R_2)/(R_1-R_2)$ satisfies the condition (4), an appropriate positive power can be imparted to the first positive lens while suppressing an angle of refraction of an incident ray on the first positive lens. In consequence, the generation of the aberration can be suppressed, and the diameter of the third lens unit can be reduced.

That is, when a value of $(R_1+R_2)/(R_1-R_2)$ is not above an upper limit of the condition (4), the powers of the lenses can easily be secured, and the diameter of the lens unit can easily be reduced.

When the value of $(R_1+R_2)/(R_1-R_2)$ is not below a lower limit of the condition (4), an incidence angle of the ray is appropriately easily reduced, and the generation of the aberration is easily suppressed.

Moreover, to gradually refract the ray, it is preferable from a viewpoint of aberration correction that a shape of the second positive lens is formed so that absolute values of paraxial radii of curvatures of opposite surfaces of the lens come close to each other, if possible.

When the second positive lens has such a shape as to satisfy the condition (5), a refractive power of one of the surfaces of the lens is prevented from being excessively enlarged, and the generation of the aberration is easily suppressed.

Furthermore, it is more preferable to set a lower limit value of the condition (4) to −0.85. It is further preferable to set an upper limit value to −0.6. In consequence, the above-mentioned effect can be produced further efficiently.

In addition, it is more preferable to set a lower limit value of the condition (5) to −0.2. It is further preferable to set an upper limit value to 0.2. In consequence, the above-mentioned effect can be produced further efficiently.

Moreover, it is preferable that the first positive lens and the second positive lens of the third lens unit satisfy the following condition:

$$0.7 < P_{31}/P_{32} < 1.8 \quad (6),$$

in which $P_{31}$ is a focal length of the first positive lens, and $P_{32}$ is a focal length of the second positive lens.

When the condition (6) is satisfied, the positive power can be prevented from being concentrated on one lens of the third lens unit, and the ray can gradually be refracted. Therefore, the spherical aberration and the axial chromatic aberration of the third lens unit can satisfactorily be corrected.

When the condition (6) is satisfied, a burden of the positive refractive power is prevented from being imposed on the only one of the positive lenses, and the generation of the aberration is easily suppressed.

Moreover, it is more preferable to set a lower limit value of the condition (6) to 0.9. Furthermore, it is further preferable to set an upper limit value to 1.7. In consequence, the above-mentioned effect can be produced further efficiently.

It is preferable that the lens of the first lens unit closest to the object side is a negative meniscus lens whose concave surface faces the image side and the image-side surface is an aspherical surface.

According to such a constitution, an off-axial light flux can gradually be refracted, an angle of view is easily secured, and the aberrations are easily reduced. In this case, a curvature of the image-side surface easily increases. In addition, an incidence state of the ray on the image-side surface easily changes during the zooming. When this image-side surface is the aspherical surface, fluctuations of the aberration during the zooming can easily be suppressed.

It is preferable that an electronic image pickup apparatus according to the present invention comprises the above-mentioned zoom lens system and an electronic image pickup device which is disposed on an image side of the zoom lens system and which converts an optical image into an electric signal. In consequence, a small-sized electronic image pickup apparatus can be constituted.

Moreover, it is preferable that this electronic image pickup apparatus has a circuit which processes an electric signal from the electronic image pickup device and which electrically corrects a distortion generated in the zoom lens system.

When a barrel type distortion is intentionally generated in the zoom lens system, a sense of spread during photographing in the wide-angle end can be emphasized, and it is possible to reduce a phenomenon in which a person positioned at a peripheral portion of a view field is photographed in an elongated manner in lateral direction. However, when a linear subject is photographed, a distortion is sometimes noticed. Such a distortion can more easily be corrected by electric signal processing.

It is to be noted that it is more preferable to simultaneously satisfy a plurality of the above-mentioned constitutions and conditions.

Next, numerical examples of the zoom lens system according to the present invention will be described.

Figure 1A:
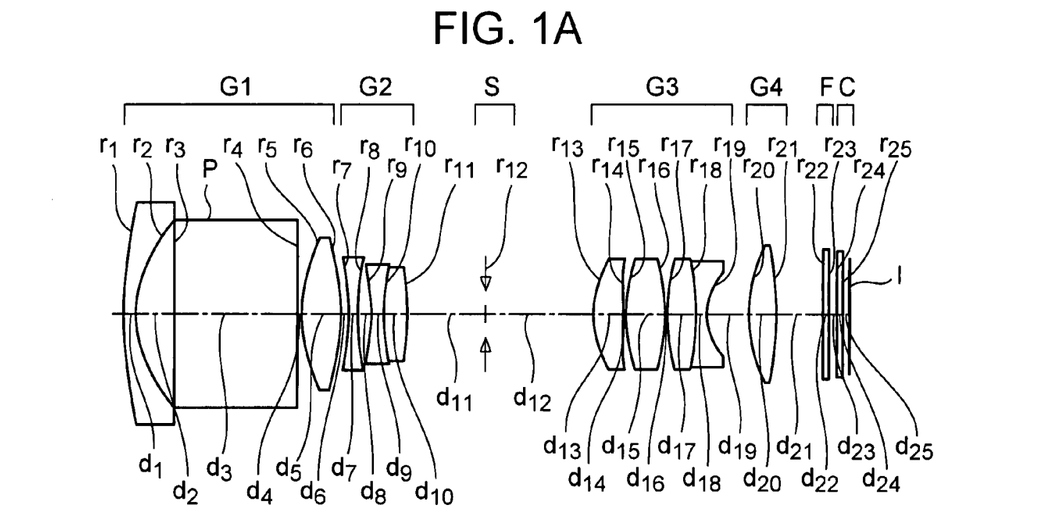
FIG. 1A is a sectional view of the system in a wide-angle end.
Figure 1B:
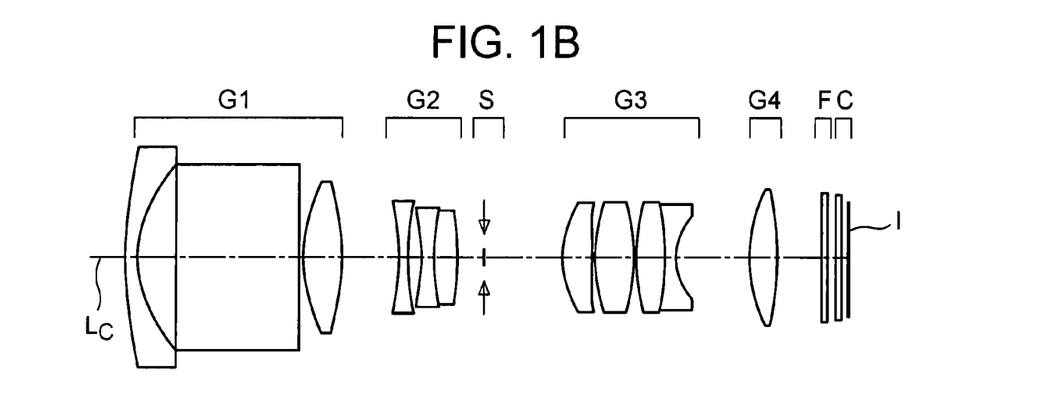
FIG. 1B is a sectional view of the system in an intermediate position.
Figure 1C:
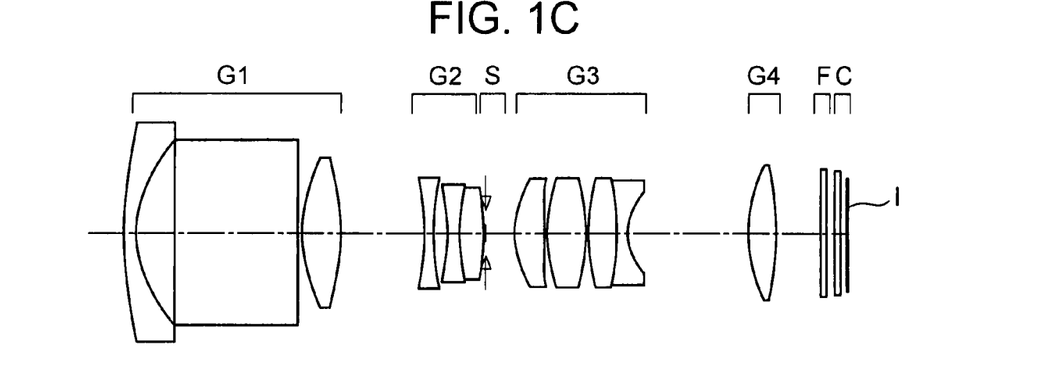
FIG. 1C is a sectional view of the system in a telephoto end.
Figure 2A:
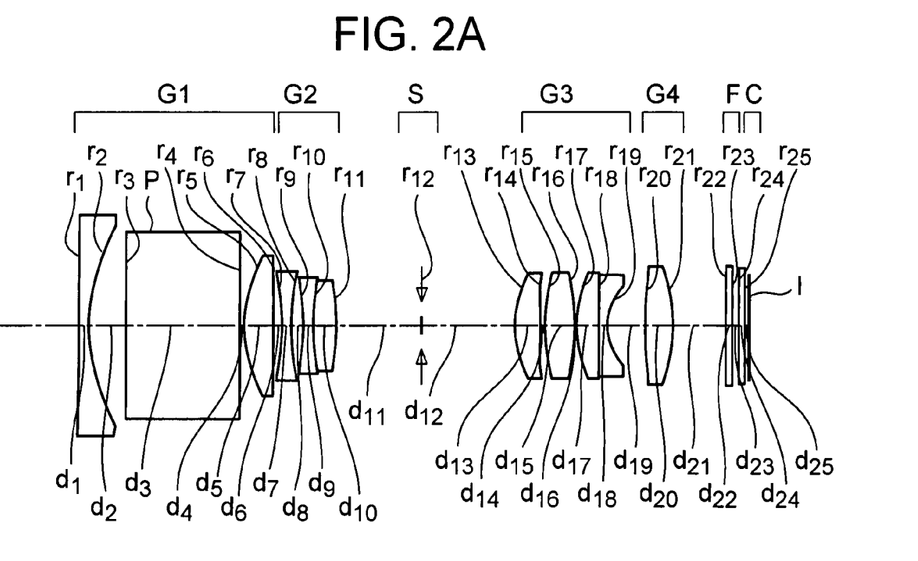
FIG. 2A is a sectional view of the system in a wide-angle end.
Figure 2B:
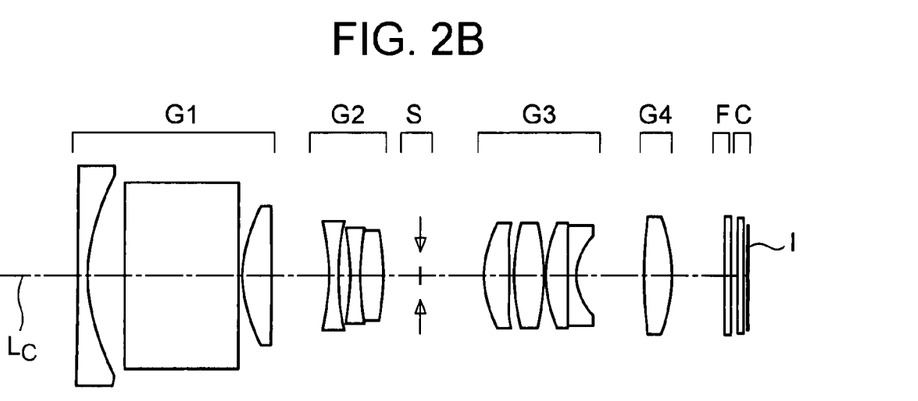
FIG. 2B is a sectional view of the system in an intermediate position.
Figure 2C:
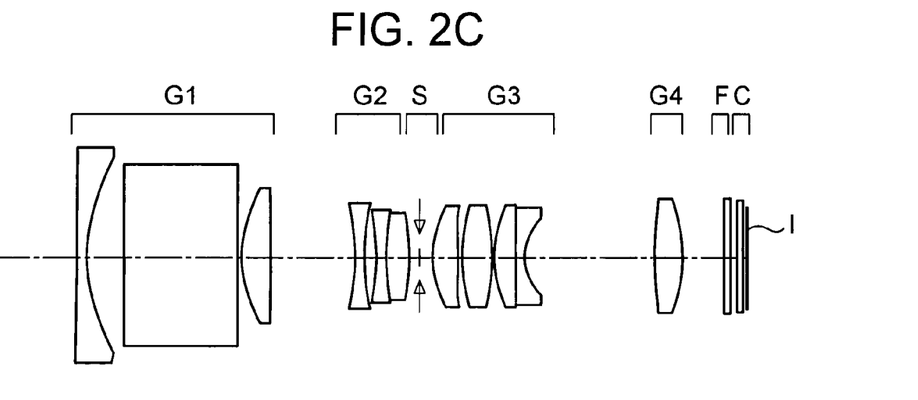
FIG. 2C is a sectional view of the system in a telephoto end.
Figure 3A:
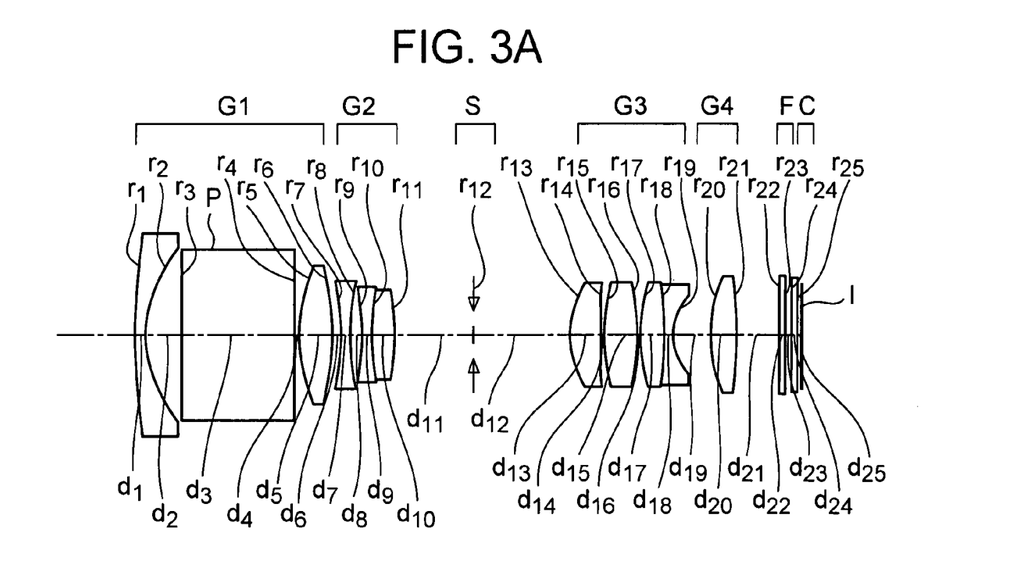
FIG. 3A is a sectional view of the system in a wide-angle end.
Figure 3B:
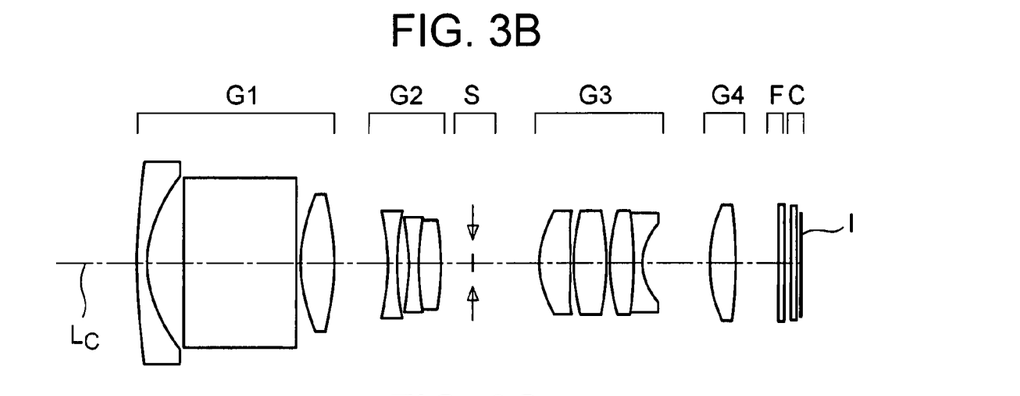
FIG. 3B is a sectional view of the system in an intermediate position.
Figure 3C:
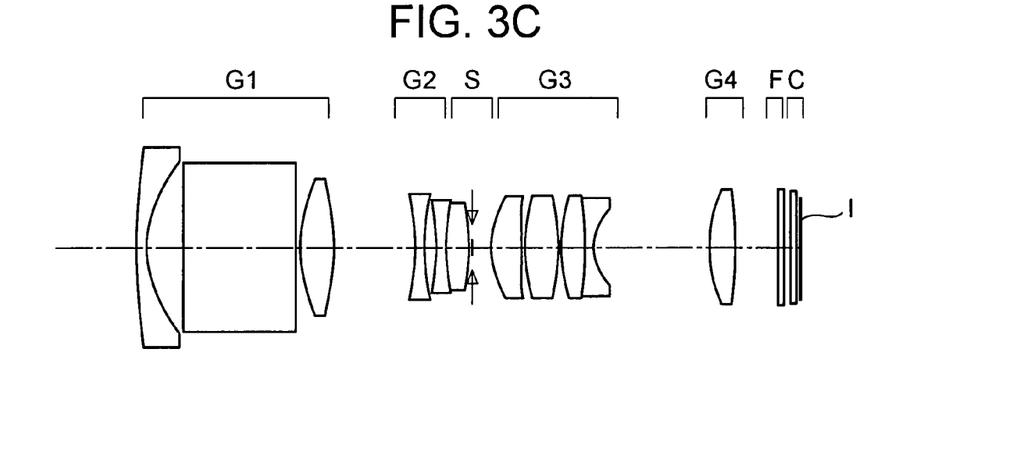
FIG. 3C is a sectional view of the system in a telephoto end.

FIGS. 1A to 3C are sectional views of Examples 1 to 3 including an optical axis when focused at infinity. FIGS. 1A, 2A and 3A are sectional views in a wide-angle end, FIGS. 1B, 2B and 3B are sectional views in an intermediate state, and FIGS. 1C, 2C and 3C are sectional views in a telephoto end. In FIGS. 1A to 3C, a first lens unit is denoted with G1, a second lens unit is denoted with G2, an aperture stop is denoted with S, a third lens unit is denoted with G3, a fourth lens unit is denoted with G4, a parallel flat plate including a low pass filter provided with a wavelength band restrictive coating which limits an infrared ray is denoted with F, a parallel flat plate of cover glass of the electronic image pickup device is denoted with C, and an image surface is denoted with I. It is to be noted that the surface of the cover glass C is provided with a multilayered thin film for limiting a wavelength band. The cover glass C may be provided with a function of the low pass filter. An optical path bending reflective prism P is disposed in the first lens unit G1, and is shown as an developed parallel flat plate in FIGS. 1A to 3C.

As shown in FIGS. 1A to 1C, Example 1 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 is fixed, the second lens unit G2 moves toward an image side, and the third lens unit G3 moves toward the object side. The fourth lens unit G4 once moves toward the object side, and reverses a movement direction thereof to move toward the image side.

The first lens unit G1 includes, in order from the object side, a first negative meniscus lens whose concave surface faces the image side, an optical path bending prism P, and a second double-convex positive lens. The second lens unit G2 includes, in order from the object side, a third double-concave negative lens, a fourth double-concave negative lens, and a fifth double-convex positive lens. The fourth double-concave negative lens is cemented to the fifth double-convex positive lens. The third lens unit G3 includes, in order from the object side, a sixth double-convex positive lens, a seventh double-convex positive lens, an eighth double-convex positive lens, and a ninth double-concave negative lens. The eighth double-convex positive lens is cemented to the ninth double-concave negative lens. The fourth lens unit G4 includes a tenth double-convex positive lens.

In this example, the sub-unit is constituted of the second double-convex positive lens, that is, only one positive single lens and optical elements included in the first lens unit G1 are only three optical elements of a negative single lens (the first negative meniscus lens), the reflective optical element (the optical path bending prism P), and a positive single lens. According to such a simply constitution, costs may be reduced.

Aspherical surfaces are used on seven surfaces including an image-side surface of the first negative meniscus lens, opposite surfaces of the second double-convex positive lens, opposite surfaces of the sixth double-convex positive lens, and opposite surface of the tenth double-convex positive lens.

As shown in FIGS. 2A to 2C, Example 2 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 is fixed, the second lens unit G2 moves toward an image side, the third lens unit G3 moves toward the object side, and the fourth lens unit G4 moves toward the image side.

The first lens unit G1 includes, in order from the object side, a first negative meniscus lens whose concave surface faces the image side, an optical path bending prism P, and a second double-convex positive lens. The second lens unit G2 includes, in order from the object side, a third double-concave negative lens, a fourth double-concave negative lens, and a fifth double-convex positive lens. The fourth double-concave negative lens is cemented to the fifth double-convex positive lens. The third lens unit G3 includes, in order from the object side, a sixth double-convex positive lens, a seventh double-convex positive lens, an eighth positive meniscus lens whose convex surface faces the object side, and a ninth negative meniscus lens whose convex surface faces the object side. The eighth positive meniscus lens is cemented to the ninth negative meniscus lens. The fourth lens unit G4 includes a tenth double-convex positive lens.

Aspherical surfaces are used on seven surfaces including an image-side surface of the first negative meniscus lens, opposite surfaces of the second double-convex positive lens, opposite surfaces of the sixth double-convex positive lens and opposite surfaces of the tenth double-convex positive lens.

As shown in FIGS. 3A to 3C, Example 3 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from a wide-angle end to a telephoto end, the first lens unit G1 is fixed, the second lens unit G2 moves toward an image side, the third lens unit G3 moves toward the object side, and the fourth lens unit G4 once moves toward the object side and then reverses a movement direction thereof to move toward the image side.

The first lens unit G1 includes, in order from the object side, a first negative meniscus lens whose concave surface faces the image side, an optical path bending prism P, and a second double-convex positive lens. The second lens unit G2 includes, in order from the object side, a third double-concave negative lens, a fourth double-concave negative lens, and a fifth double-convex positive lens. The fourth double-concave negative lens is cemented to the fifth double-convex positive lens. The third lens unit G3 includes, in order from the object side, a sixth double-convex positive lens, a seventh double-convex positive lens, an eighth double-convex positive lens, and a ninth double-concave negative lens. The eighth double-convex positive lens is cemented to the ninth double-concave negative lens. The fourth lens unit G4 includes a tenth double-convex positive lens.

Aspherical surfaces are used on seven surfaces including an image-side surface of the first negative meniscus lens, opposite surfaces of the second double-convex positive lens, opposite surfaces of the sixth double-convex positive lens, and opposite surfaces of the tenth double-convex positive lens.

Next, numerical data of the above examples will be described. In addition to the above symbols, f is a focal length of a zoom lens system, $F_{NO}$ is the F-number, $\omega$ is an angle of view, WE is a wide-angle end, ST is an intermediate position, TE is a telephoto end, $r_1, r_2, \ldots$ are radii of curvatures of lens surfaces, $d_1, d_2, \ldots$ are spaces between the lens surfaces, $n_{d1}, n_{d2}, \ldots$ are refractive indices of lenses for the d-line, and $v_{d1}, v_{d2}, \ldots$ are the Abbe numbers of the lenses. Symbol (AS) after the radius of curvature indicates that the surface is an aspherical surface, (S) indicates that the surface is an aperture stop surface, and (I) indicates that the surface is an image surface, respectively. It is to be noted that a shape of the aspherical surface is represented by the following equation in a coordinate system in which an intersection between the surface and the optical axis is an origin, an optical axis is an x-axis (a ray travel direction is a positive direction) and a y-axis passes through the origin and extends vertically to the optical axis:

$$x = (y^2/r)/[1 + \{1 - (K+1)(y/r)^2\}^{1/2}] + A_4 y^4 + A_6 y^6 + A_8 y^8 + A_{10} y^{10} + A_{12} y^{12},$$

in which r is a paraxial radius of curvature, K is a conic constant, and $A_4, A_6, A_8, A_{10}$ and $A_{12}$ are 4-th, 6-th, 8-th, 10-th and 12-th order aspherical coefficients. In the aspherical surface coefficient, "e-n" (n is an integer) indicates "$\times 10^{-n}$".

EXAMPLE 1

| | | | |
|---|---|---|---|
| $r_1 = 39.500$ | $d_1 = 0.80$ | $n_{d1} = 2.00170$ | $v_{d1} = 20.60$ |
| $r_2 = 9.307$(AS) | $d_2 = 2.82$ | | |
| $r_3 = \infty$ | $d_3 = 9.00$ | $n_{d2} = 1.83400$ | $v_{d2} = 37.16$ |
| $r_4 = \infty$ | $d_4 = 0.20$ | | |
| $r_5 = 12.580$(AS) | $d_5 = 2.91$ | $n_{d3} = 1.71300$ | $v_{d3} = 53.87$ |
| $r_6 = -16.892$(AS) | $d_6 =$ variable | | |
| $r_7 = -21.881$ | $d_7 = 0.70$ | $n_{d4} = 1.88300$ | $v_{d4} = 40.76$ |
| $r_8 = 15.332$ | $d_8 = 1.15$ | | |
| $r_9 = -12.701$ | $d_9 = 0.70$ | $n_{d5} = 1.88300$ | $v_{d5} = 40.76$ |
| $r_{10} = 14.117$ | $d_{10} = 1.80$ | $n_{d6} = 1.92286$ | $v_{d6} = 20.88$ |
| $r_{11} = -22.374$ | $d_{11} =$ variable | | |
| $r_{12} = \infty$(S) | $d_{12} =$ variable | | |
| $r_{13} = 8.306$(AS) | $d_{13} = 2.21$ | $n_{d7} = 1.60562$ | $v_{d7} = 43.72$ |
| $r_{14} = -47.108$(AS) | $d_{14} = 0.20$ | | |
| $r_{15} = 12.266$ | $d_{15} = 2.94$ | $n_{d8} = 1.49700$ | $v_{d8} = 81.54$ |
| $r_{16} = -14.421$ | $d_{16} = 0.10$ | | |
| $r_{17} = 14.842$ | $d_{17} = 2.14$ | $n_{d9} = 1.48749$ | $v_{d9} = 70.23$ |
| $r_{18} = -17.807$ | $d_{18} = 0.82$ | $n_{d10} = 1.92286$ | $v_{d10} = 20.88$ |
| $r_{19} = 4.864$ | $d_{19} =$ variable | | |
| $r_{20} = 9.403$(AS) | $d_{20} = 2.00$ | $n_{d11} = 1.49700$ | $v_{d11} = 81.54$ |
| $r_{21} = -87.995$(AS) | $d_{21} =$ variable | | |
| $r_{22} = \infty$ | $d_{22} = 0.50$ | $n_{d12} = 1.54771$ | $v_{d12} = 62.84$ |
| $r_{23} = \infty$ | $d_{23} = 0.50$ | | |
| $r_{24} = \infty$ | $d_{24} = 0.50$ | $n_{d13} = 1.51633$ | $v_{d13} = 64.14$ |
| $r_{25} = \infty$ | $d_{25} = 0.39$ | | |
| $r_{26} = \infty$(I) | | | |

| Aspherical coefficient |
|---|
| 2nd surface |

$r = 9.307$
$K = 0.000$
$A_4 = -9.62954\text{e-}05$    $A_6 = -9.91838\text{e-}07$    $A_8 = 4.44030\text{e-}09$
$A_{10} = -1.56989\text{e-}10$ 5th surface $r = 12.580$
$K = 0.000$
$A_4 = -8.95438\text{e-}05$    $A_6 = 5.36299\text{e-}07$    $A_8 = -4.29158\text{e-}08$
$A_{10} = 1.58586\text{e-}09$ 6th surface $r = -16.892$
$K = 0.000$
$A_4 = 6.15799\text{e-}05$    $A_6 = 1.51272\text{e-}06$    $A_8 = -7.64944\text{e-}08$
$A_{10} = 2.20503\text{e-}09$ -continued

13th surface r = 8.306
K = 0.000
$A_4 = 7.75773e-05$    $A_6 = -4.26074e-06$    $A_8 = 1.19693e-06$
$A_{10} = -1.19729e-08$

14th surface r = −47.108
K = 0.000
$A_4 = 6.39340e-04$    $A_6 = 8.68992e-08$    $A_8 = 1.27478e-06$

20th surface r = 9.403
K = 0.000
$A_4 = -2.91158e-04$

21st surface r = −87.995
K = 0.000
$A_4 = -5.22271e-04$    $A_6 = 4.57457e-06$

Zoom Data(∞)

|  | WE | ST | TE |
|---|---|---|---|
| f(mm) | 5.060 | 9.390 | 17.400 |
| $F_{NO}$ | 3.57 | 4.48 | 5.10 |
| $d_6$ | 0.50 | 3.94 | 6.36 |
| $d_{11}$ | 5.96 | 2.51 | 0.10 |
| $d_{12}$ | 8.05 | 5.47 | 1.90 |
| $d_{19}$ | 3.00 | 5.26 | 9.15 |
| $d_{21}$ | 3.50 | 3.82 | 3.50 |

EXAMPLE 2

| | | | |
|---|---|---|---|
| $r_1 = 494.305$ | $d_1 = 0.80$ | $n_{d1} = 2.00060$ | $v_{d1} = 25.46$ |
| $r_2 = 11.811(AS)$ | $d_2 = 2.81$ | | |
| $r_3 = \infty$ | $d_3 = 9.00$ | $n_{d2} = 1.83400$ | $v_{d2} = 37.16$ |
| $r_4 = \infty$ | $d_4 = 0.20$ | | |
| $r_5 = 9.368(AS)$ | $d_5 = 2.55$ | $n_{d3} = 1.71300$ | $v_{d3} = 53.87$ |
| $r_6 = -40.214(AS)$ | $d_6 = $ variable | | |
| $r_7 = -22.842$ | $d_7 = 0.70$ | $n_{d4} = 1.88300$ | $v_{d4} = 40.76$ |
| $r_8 = 14.261$ | $d_8 = 1.15$ | | |
| $r_9 = -13.699$ | $d_9 = 0.70$ | $n_{d5} = 1.88300$ | $v_{d5} = 40.76$ |
| $r_{10} = 20.441$ | $d_{10} = 1.80$ | $n_{d6} = 1.92286$ | $v_{d6} = 20.88$ |
| $r_{11} = -20.240$ | $d_{11} = $ variable | | |
| $r_{12} = \infty(S)$ | $d_{12} = $ variable | | |
| $r_{13} = 7.979(AS)$ | $d_{13} = 1.95$ | $n_{d7} = 1.61772$ | $v_{d7} = 49.83$ |
| $r_{14} = -66.841(AS)$ | $d_{14} = 0.20$ | | |
| $r_{15} = 15.960$ | $d_{15} = 2.43$ | $n_{d8} = 1.49700$ | $v_{d8} = 81.54$ |
| $r_{16} = -18.074$ | $d_{16} = 0.10$ | | |
| $r_{17} = 10.141$ | $d_{17} = 1.73$ | $n_{d9} = 1.48749$ | $v_{d9} = 70.23$ |
| $r_{18} = 60.508$ | $d_{18} = 0.80$ | $n_{d10} = 1.92286$ | $v_{d10} = 20.88$ |
| $r_{19} = 4.794$ | $d_{19} = $ variable | | |
| $r_{20} = 20.078(AS)$ | $d_{20} = 2.00$ | $n_{d11} = 1.49700$ | $v_{d11} = 81.54$ |
| $r_{21} = -32.393(AS)$ | $d_{21} = $ variable | | |
| $r_{22} = \infty$ | $d_{22} = 0.50$ | $n_{d12} = 1.54771$ | $v_{d12} = 62.84$ |
| $r_{23} = \infty$ | $d_{23} = 0.50$ | | |
| $r_{24} = \infty$ | $d_{24} = 0.50$ | $n_{d13} = 1.51633$ | $v_{d13} = 64.14$ |
| $r_{25} = \infty$ | $d_{25} = 0.39$ | | |
| $r_{26} = \infty(I)$ | | | |

Aspherical coefficient

2nd surface r = 11.811
K = 0.000
$A_4 = -2.73638e-04$    $A_6 = 1.45043e-06$    $A_8 = -1.80429e-08$
$A_{10} = 1.01184e-11$

5th surface r = 9.368
K = 0.000
$A_4 = -1.66101e-04$    $A_6 = -2.19977e-06$    $A_8 = 3.76909e-08$
$A_{10} = 8.07540e-10$

6th surface r = −40.214
K = 0.000
$A_4 = 9.09423e-05$    $A_6 = -2.75538e-06$    $A_8 = 8.68218e-08$
$A_{10} = 2.96363e-10$

13th surface r = 7.979
K = 0.000
$A_4 = 1.46351e-04$    $A_6 = 1.32395e-06$    $A_8 = 1.84723e-06$
$A_{10} = -1.65575e-08$

14th surface r = −66.841
K = 0.000
$A_4 = 7.35746e-04$    $A_6 = 4.95611e-06$    $A_8 = 2.22872e-06$

20th surface r = 20.078
K = 0.000
$A_4 = -7.44279e-04$

21st surface r = −32.393
K = 0.000
$A_4 = -1.12065e-03$    $A_6 = 1.93134e-06$

Zoom Data(∞)

|  | WE | ST | TE |
|---|---|---|---|
| f(mm) | 5.060 | 9.350 | 17.400 |
| $F_{NO}$ | 3.57 | 4.37 | 5.10 |
| $d_6$ | 0.50 | 4.47 | 6.59 |
| $d_{11}$ | 6.93 | 2.96 | 0.84 |
| $d_{12}$ | 7.68 | 5.39 | 1.16 |
| $d_{19}$ | 3.00 | 5.51 | 10.48 |
| $d_{21}$ | 4.47 | 4.25 | 3.50 |

EXAMPLE 3

| | | | |
|---|---|---|---|
| $r_1 = 50.434$ | $d_1 = 0.80$ | $n_{d1} = 2.00170$ | $v_{d1} = 20.60$ |
| $r_2 = 9.846(AS)$ | $d_2 = 2.81$ | | |
| $r_3 = \infty$ | $d_3 = 9.00$ | $n_{d2} = 1.83400$ | $v_{d2} = 37.16$ |
| $r_4 = \infty$ | $d_4 = 0.20$ | | |
| $r_5 = 14.005(AS)$ | $d_5 = 2.82$ | $n_{d3} = 1.71726$ | $v_{d3} = 52.75$ |
| $r_6 = -15.783(AS)$ | $d_6 = $ variable | | |
| $r_7 = -26.009$ | $d_7 = 0.70$ | $n_{d4} = 1.88300$ | $v_{d4} = 40.76$ |
| $r_8 = 16.554$ | $d_8 = 1.15$ | | |
| $r_9 = -11.351$ | $d_9 = 0.70$ | $n_{d5} = 1.88300$ | $v_{d5} = 40.76$ |
| $r_{10} = 14.262$ | $d_{10} = 1.80$ | $n_{d6} = 1.92286$ | $v_{d6} = 20.88$ |
| $r_{11} = -21.741$ | $d_{11} = $ variable | | |
| $r_{12} = \infty(S)$ | $d_{12} = $ variable | | |
| $r_{13} = 8.027(AS)$ | $d_{13} = 2.46$ | $n_{d7} = 1.61433$ | $v_{d7} = 47.89$ |
| $r_{14} = -41.790(AS)$ | $d_{14} = 0.20$ | | |
| $r_{15} = 14.130$ | $d_{15} = 2.63$ | $n_{d8} = 1.49804$ | $v_{d8} = 81.34$ |
| $r_{16} = -16.368$ | $d_{16} = 0.21$ | | |
| $r_{17} = 13.343$ | $d_{17} = 2.01$ | $n_{d9} = 1.53151$ | $v_{d9} = 74.20$ |
| $r_{18} = -27.377$ | $d_{18} = 0.80$ | $n_{d10} = 1.91189$ | $v_{d10} = 21.14$ |
| $r_{19} = 4.621$ | $d_{19} = $ variable | | |
| $r_{20} = 12.180(AS)$ | $d_{20} = 2.00$ | $n_{d11} = 1.49422$ | $v_{d11} = 78.19$ |
| $r_{21} = -44.589(AS)$ | $d_{21} = $ variable | | |
| $r_{22} = \infty$ | $d_{22} = 0.50$ | $n_{d12} = 1.54771$ | $v_{d12} = 62.84$ |
| $r_{23} = \infty$ | $d_{23} = 0.50$ | | |
| $r_{24} = \infty$ | $d_{24} = 0.50$ | $n_{d13} = 1.51633$ | $v_{d13} = 64.14$ |
| $r_{25} = \infty$ | $d_{25} = 0.39$ | | |
| $r_{26} = \infty(I)$ | | | |

-continued

Aspherical coefficient

2nd surface r = 9.846
K = 0.000
$A_4 = -4.36169e{-}05$  $A_6 = -1.36834e{-}06$  $A_8 = 1.46510e{-}08$
$A_{10} = -9.59218e{-}11$ 5th surface r = 14.005
K = 0.000
$A_4 = -3.76146e{-}05$  $A_6 = 1.43503e{-}06$  $A_8 = -1.34648e{-}07$
$A_{10} = 4.03631e{-}09$ 6th surface r = −15.783
K = 0.000
$A_4 = 9.80279e{-}05$  $A_6 = 1.87320e{-}06$  $A_8 = -1.49840e{-}07$
$A_{10} = 4.45143e{-}09$ 13th surface r = 8.027
K = 0.000
$A_4 = -9.98174e{-}07$  $A_6 = -6.78785e{-}06$  $A_8 = 9.70084e{-}07$
$A_{10} = -9.49362e{-}09$ 14th surface r = −41.790
K = 0.000
$A_4 = 5.90717e{-}04$  $A_6 = -2.59522e{-}06$  $A_8 = 9.79218e{-}07$ 20th surface r = 12.180
K = 0.000
$A_4 = -1.02620e{-}05$ 21st surface r = −44.589
K = 0.000
$A_4 = -2.01290e{-}04$  $A_6 = 6.54086e{-}07$ Zoom Data(∞)

|  | WE | ST | TE |
|---|---|---|---|
| f(mm) | 5.060 | 9.383 | 17.400 |
| $F_{NO}$ | 3.57 | 4.51 | 5.10 |
| $d_6$ | 0.50 | 4.03 | 6.36 |
| $d_{11}$ | 6.33 | 2.80 | 0.46 |
| $d_{12}$ | 7.89 | 5.33 | 1.54 |
| $d_{19}$ | 3.00 | 5.45 | 9.35 |
| $d_{21}$ | 3.50 | 3.61 | 3.50 |

Each of these examples is constituted of a four-unit zoom lens system which includes only four lens units. Reduction of the number of lens units is effective for cutting costs.

Figure 4A:
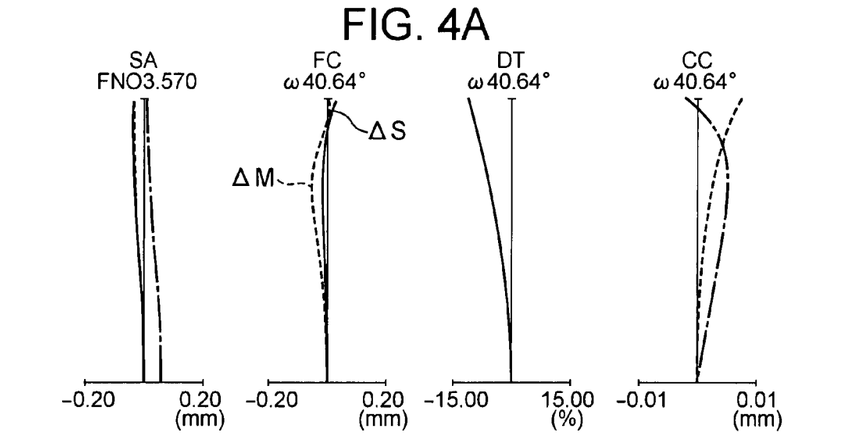
FIG. 4A shows a state of the wide-angle end.
Figure 4B:
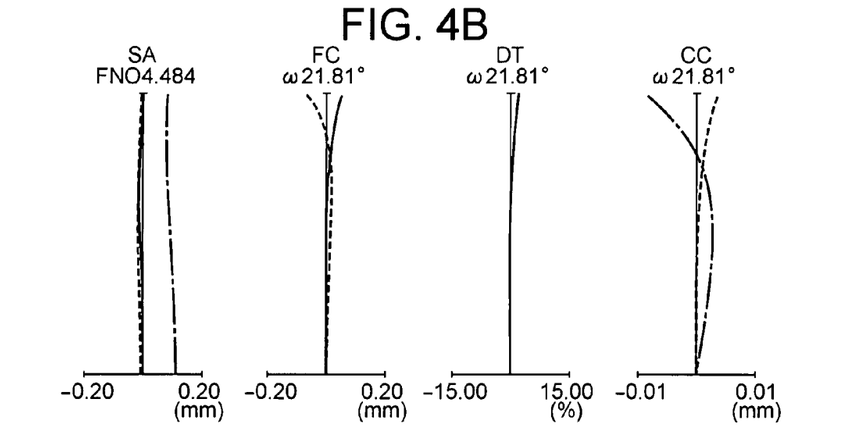
FIG. 4B shows a state of the intermediate position.
Figure 4C:
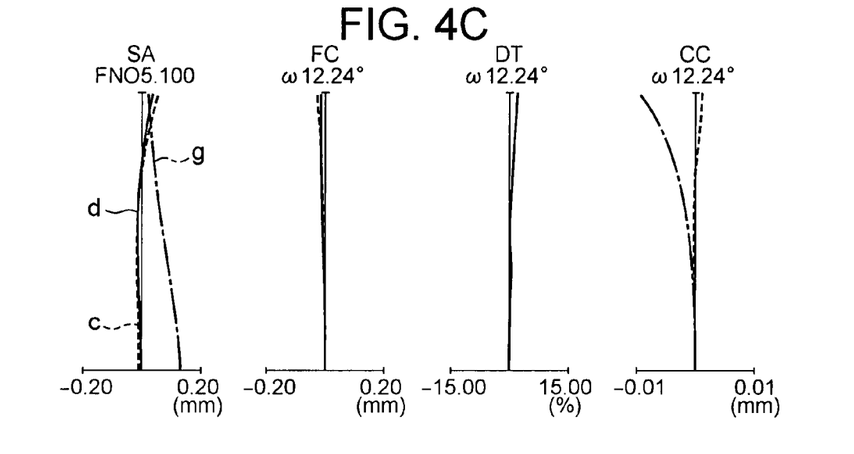
FIG. 4C shows a state of the telephoto end.
Figure 5A:
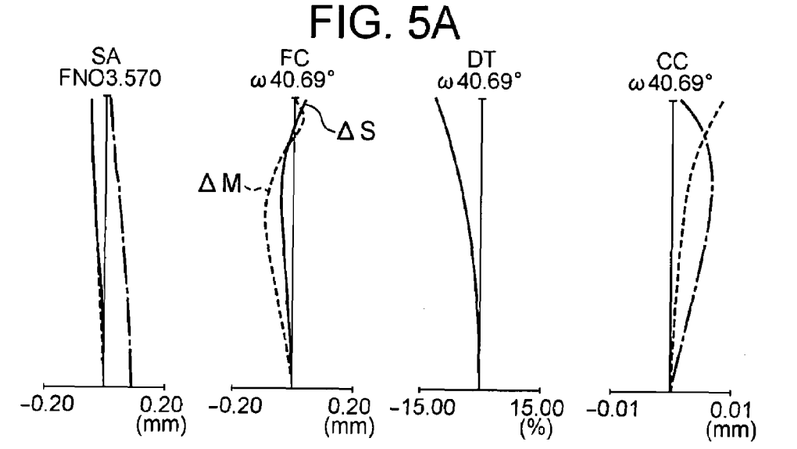
FIG. 5A shows a state of the wide-angle end.
Figure 5B:
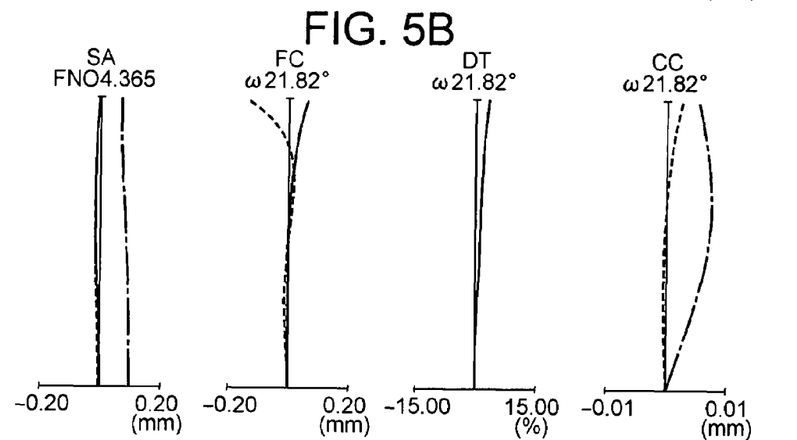
FIG. 5B shows a state of the intermediate position.
Figure 5C:
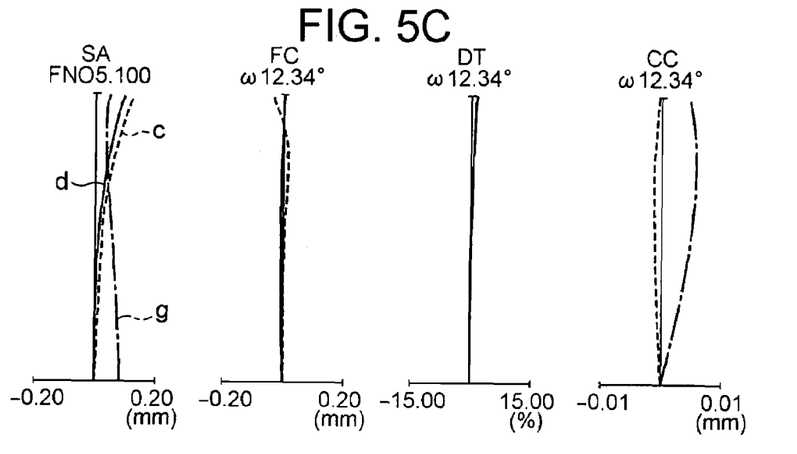
FIG. 5C shows a state of the telephoto end.
Figure 6A:
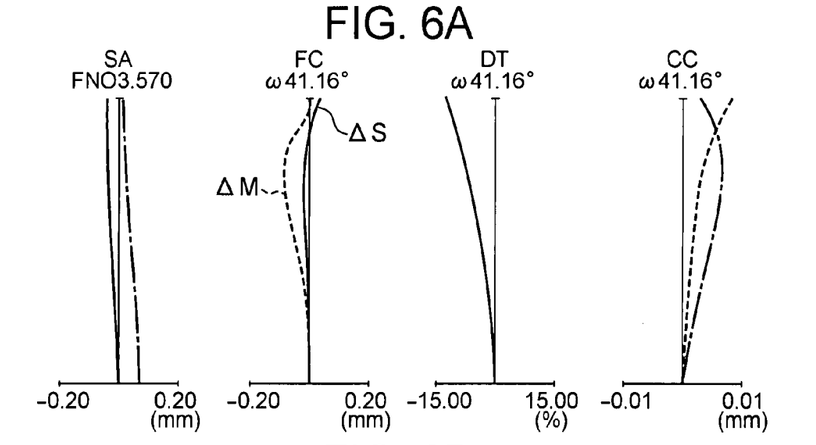
FIG. 6A shows a state of the wide-angle end.
Figure 6B:
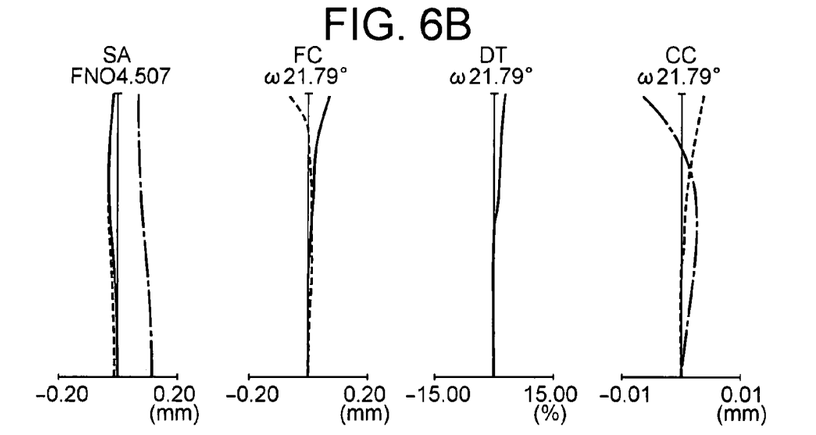
FIG. 6B shows a state of the intermediate position.
Figure 6C:
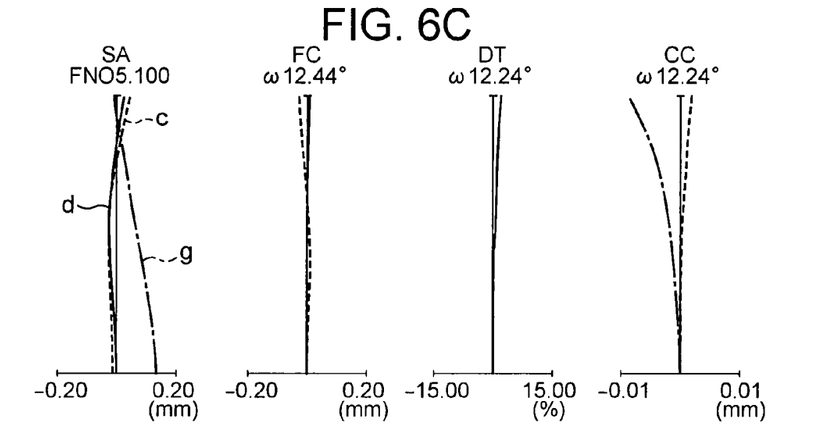
FIG. 6C shows a state of the telephoto end.

FIGS. 4A to 6C show aberration diagrams of Examples 1 to 3 when focused at infinity, respectively. In these aberration drawings, FIGS. 4A, 5A and 6A show a spherical aberration (SA), an astigmatism (FC), a distortion (DT) and a chromatic aberration (CC) of magnification in the wide-angle end. FIGS. 4B, 5B and 6B show the aberrations in the intermediate position, and FIGS. 4C, 5C and 6C show the aberrations in the telephoto end. In the drawings, c is a half angle of view.

Next, values of the conditions (1) to (6) of the examples will be described.

| Conditions | Example 1 | Example 2 | Example 3 |
|---|---|---|---|
| (1) $n_d$ | 2.00 | 2.00 | 2.00 |
| (2) $v_d$ | 20.60 | 25.40 | 20.60 |

-continued

| Conditions | Example 1 | Example 2 | Example 3 |
|---|---|---|---|
| (3) $D_{13}/f_1$ | 0.96 | 0.86 | 0.92 |
| (4) $(R_1 + R_2)/(R_1 - R_2)$ | −0.70 | −0.79 | −0.68 |
| (5) $(R_3 + R_4)/(R_3 - R_4)$ | −0.08 | −0.06 | −0.07 |
| (6) $P_{31}/P_{32}$ | 1.17 | 1.50 | 1.40 |

Next, a basic concept in a case where an image distortion generated in the zoom lens system is electrically corrected will be described.

Figure 7:
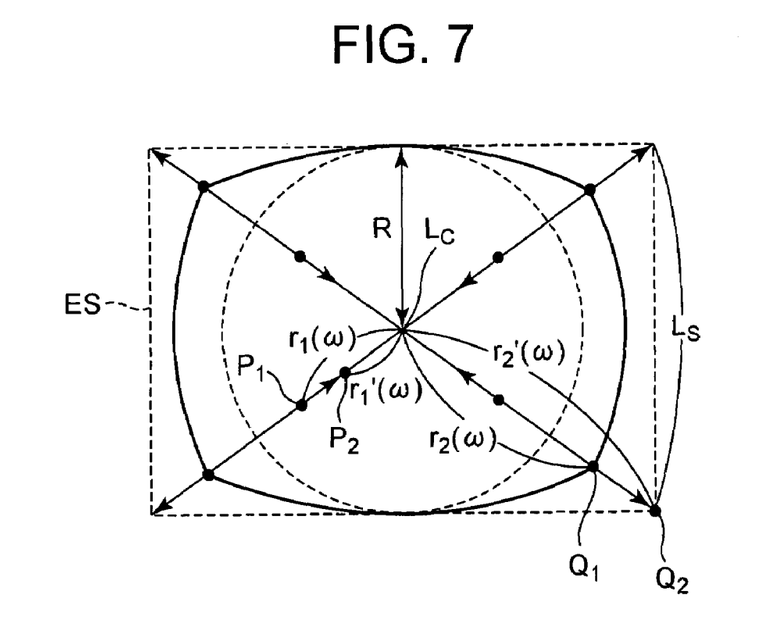
FIG. 7 is a diagram showing a basic concept in a case where a distortion of an image is electrically corrected.
Figure 8:
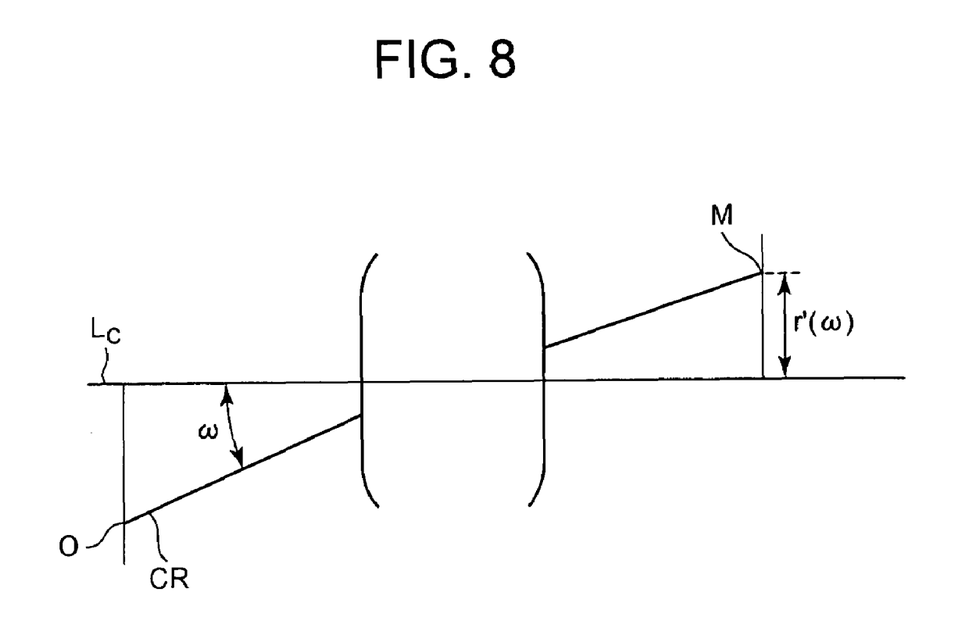
FIG. 8 is a diagram showing meaning of a half angle of an object view.

As shown in FIG. 7, a circle which comes in contact with long sides of an effective image pickup surface ES having center thereof at an intersection between an optical axis Lc and the image pickup surface and which has a radius R (an image height R) is considered. Magnifications at points on the circumference of this circle are fixed, and circumferential points are regarded as references for the correction. Moreover, other circumferential points along an arbitrary radius r(ω) (the image height r(ω)) are moved in a substantially radial direction, and are concentrically moved so as to provide a radius r'(ω). In consequence, a distortion of the optical image is corrected. For example, in FIG. 7, a point $P_1$ positioned inwardly from the circle having the radius R on a circumference of an arbitrary radius $r_1(\omega)$ is moved to a point $P_2$ on a circumference of the radius $r_1'(\omega)$ inwardly toward the center of the circle. A point $Q_1$ positioned on a circumference of an arbitrary radius $r_2(\omega)$ outside the circle having the radius R is moved to a point $Q_2$ on a circumference of a radius $r_2'(\omega)$ away from the center of the circle. Here, the radius r'(ω) can be represented as follows:

$$r'(\omega) = \alpha \cdot f \cdot \tan \omega \, (0 \leq \alpha \leq 1),$$

in which ω is a half angle of an object view, and f is a focal length of an image forming optical system (a zoom lens in the present invention). Here, as shown in FIG. 8, the half angle of the object view is an angle between the optical axis Lc and a chief ray CR from an object point O corresponding to an image point M formed at a position of a height r'(ω) from the center of the image pickup surface.

Here, assuming that an ideal image height corresponding to a point on the circumference of the radius R (the image height) is Y, the following equation results:

$$\alpha = R/Y = R/(f \tan \omega).$$

Ideally, the optical system is rotationally symmetric with respect to the optical axis. Therefore, the distortion is also rotationally symmetrically generated with respect to the optical axis. In a case where the optically generated distortion is electrically corrected, if the distortion can be corrected using symmetry with respect to the optical axis as described above, the correction is advantageous in respect of a data amount and a calculation amount.

However, when the optical image is picked up with an electronic image pickup device, the image is not represented by a continuous amount due to sampling by pixels of the image pickup device. Therefore, the circle of the radius R virtually drawn on the optical image is not a strictly correct circle, if the pixels are not radially arranged on the image pickup surface of the electronic image pickup device. That is, to correct a shape of an image given as an aggregate of data obtained from discrete coordinate points (the pixels of the electronic image pickup device), the circle having the magnification fixed as described above does not actually exist. Therefore, it is preferable to use a method of determining a moved coordinate $(X_i', Y_j')$ for each pixel (coordinate $(X_i, Y_j)$). It is to be noted that when a plurality of pixels move to a position of one coordinate $(X_i', Y_j')$, an average value of values of the pixels is obtained as data of the pixels at positions of the coordinate $(X_i', Y_j')$. Moreover, data of a position where any point does not come is prepared by interpolation using data of several surrounding pixels having data generated by the movements of the pixels.

Especially, in an electronic image pickup apparatus of the zoom lens system, such a method is effective for the correction in a case where the point of the optical image in which the magnification should be fixed does not exist on the circumference around the optical axis, and the circle of the radius R drawn on the optical image is asymmetric due to manufacturing errors and the like of the optical system and the electronic image pickup device.

In the electronic image pickup apparatus in which such correction is performed, to calculate a correction amount $r'(\omega)-r(\omega)$, data indicating a relation between the half angle $\omega$ of the object view and the image height r, or data indicating a relation between the actual image height r and an ideal image height r' and $\alpha$ may be recorded in a recording medium incorporated in the electronic image pickup apparatus.

It is to be noted that the radius R may satisfy the following condition so that a light quantity does not excessively fall short at opposite ends of the image in a short-side direction, after the distortion of the image has been corrected.

$0 \leq R \leq 0.6 L_S,$ in which $L_S$ is a length of the short side of the effective image pickup surface.

The radius R preferably satisfies the following condition.

$0.3 L_S \leq R \leq 0.6 L_S.$

Furthermore, it is most advantageous that the radius R is substantially equal to the radius of the circle which comes in contact with the long sides of the effective image pickup surface.

It is to be noted that in a case where the magnification is fixed in the vicinity of the radius R=0, that is, in the vicinity of the optical axis to perform the correction, a region extended in a radial direction increases. Therefore, the constitution is slightly disadvantageous in respect of the number of the pixels, but it is possible to secure an effect that the zoom lens system can be miniaturized even at a wide angle.

It is to be noted that the correction of the distortion of one image has been described above, but the focal length of the zoom lens system changes, and a state of the distortion included in the image changes with the change of the focal length. Therefore, it is preferable that a focal length zone which requires the correction between a maximum value (the telephoto end) and a minimum value (the wide-angle end) of the focal length is divided into several focal length zones to correct the distortion. For example, a correction amount is set so as to obtain a correction result which substantially satisfies $r'(\omega)=\alpha \cdot f \cdot \tan \omega$ in each divided focal length zone in the vicinity of the telephoto end (a state in which the focal length is maximized in each zone), and the distortion of the image can be corrected in the corresponding zone by use of this correction amount. However, in this case, a certain degree of barrel type distortion remains in the resultant image in each divided focal length zone in the wide-angle end (a state in which the focal length is minimized in each zone). To avoid this, if the number of the focal length zones is increased, an amount of the data to be recorded for the correction in the recording medium increases. Therefore, one or several coefficients with respect to one or several focal lengths different from those in the wide-angle end and the telephoto end of each divided focal length zone are calculated beforehand. These coefficients may be determined based on simulation or a measurement result obtained in a case where the image pickup apparatus is actually used. Moreover, the correction amount is calculated so as to obtain the correction result which substantially satisfies the following condition in the vicinity of the telephoto end of each divided focal length zone:

$r'(\omega)=\alpha \cdot f \cdot \tan \omega.$

This correction amount may be multiplied by the coefficient for each focal length to determine the correction amount in the state of the focal length.

In addition, in a case where any distortion is not seen in an image obtained when focused at infinity, the following is established:

$f=y/\tan \omega,$ in which y is a height (an image height) of the image point from the optical axis, f is a focal length of the image forming system (the zoom lens system in the present invention), and $\omega$ is a half angle of an object view.

In a case where the image forming system has the barrel type distortion, the following results:

$f > y/\tan \omega.$

That is, assuming that the focal length f and the image height y of the image forming system are constant, a value of $\omega$ increases.

Next, an embodiment of an electronic image pickup apparatus to which the zoom lens system of the present invention is applied will be described.

Figure 9:
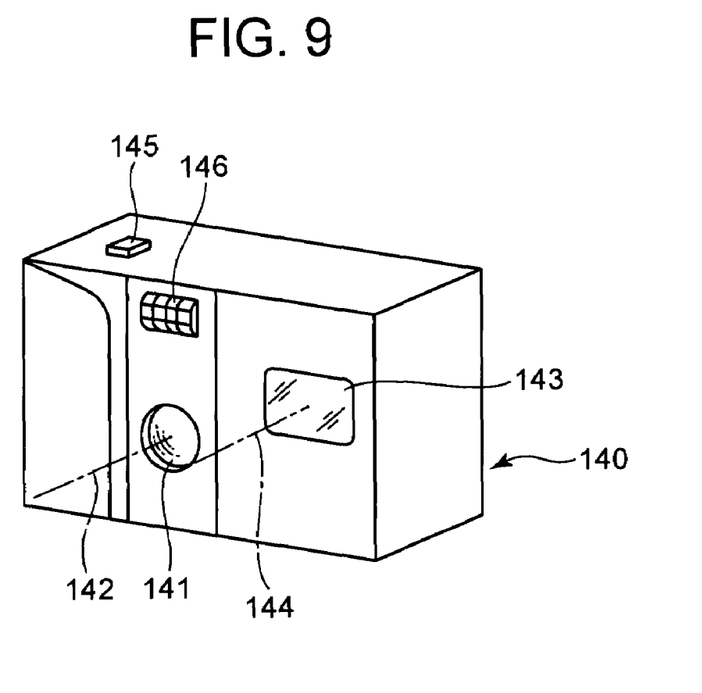
FIG. 9 is a front perspective view showing an appearance of a digital camera according to an example of the present invention.
Figure 10:
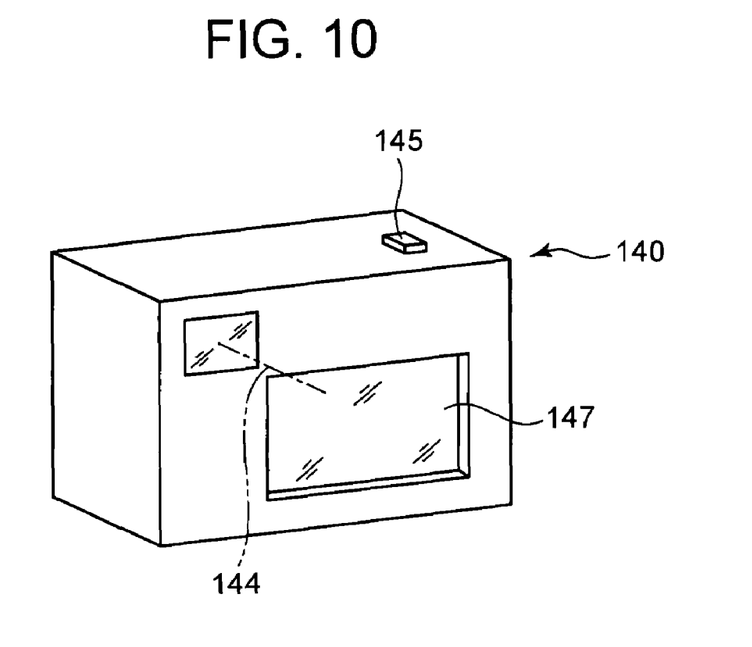
FIG. 10 is a back perspective view of the digital camera of FIG. 9.
Figure 11:
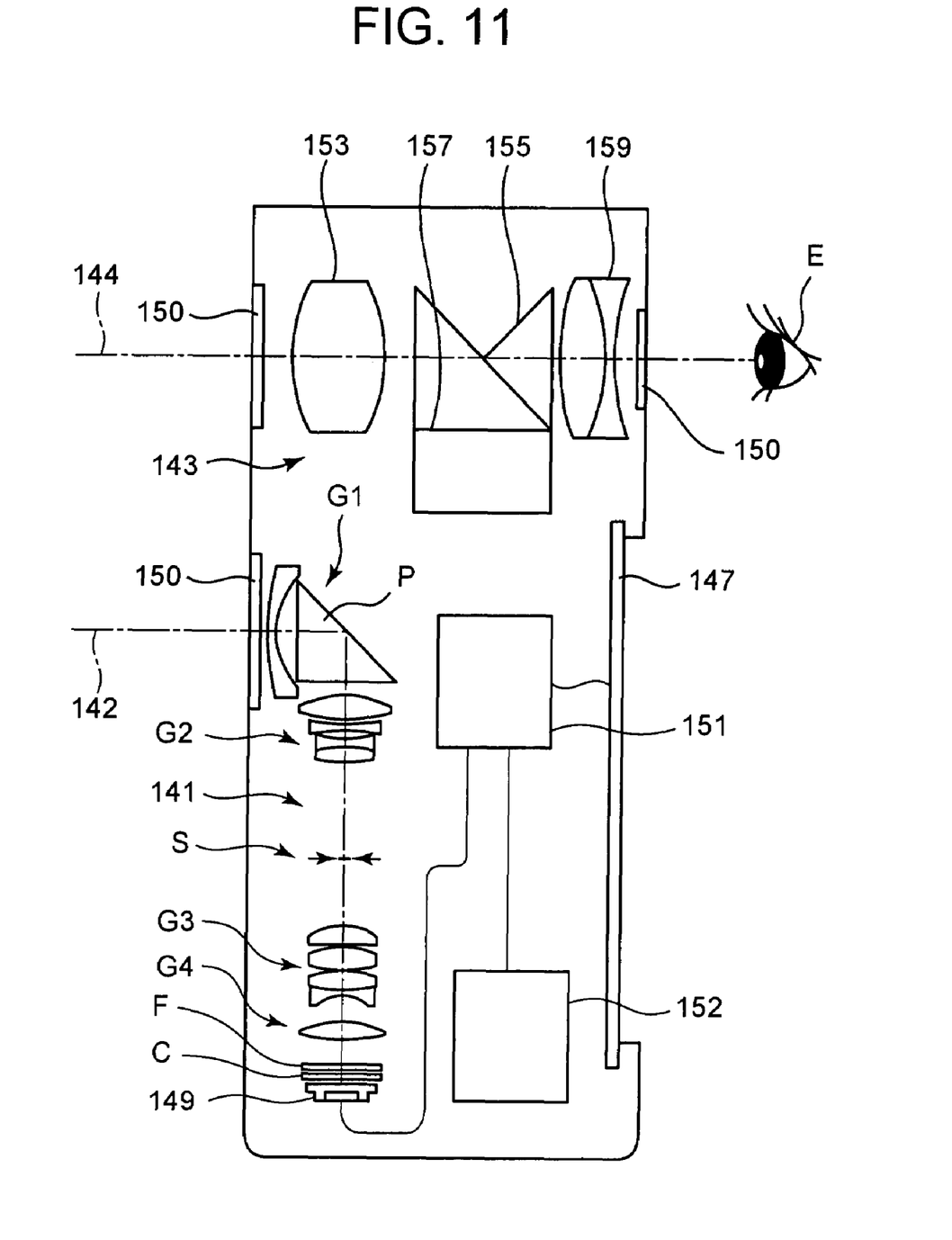
FIG. 11 is a schematic diagram showing an inner constitution of the digital camera of FIG. 9.

FIGS. 9 to 11 are conceptual diagrams showing a constitution of a digital camera in which the zoom lens system of the present invention is incorporated as a photographing optical system. FIG. 9 is a front perspective view showing an appearance of a digital camera 140, FIG. 10 is a back perspective view of the digital camera, and FIG. 11 is a schematic sectional view showing an internal constitution of the digital camera.

The digital camera 140 includes a photographing optical system 141 having an optical path 142 for photographing, a finder optical system 143 having an optical path 144 for a finder, a shutter release button 145, a flash lamp 146, a liquid crystal display monitor 147 and the like. When a shutter release button 145 disposed at an upper portion of the camera 140 is pressed, the photographing is performed through the photographing optical system 141 in response to the pressed button. In this example, the zoom lens system shown in FIG. 1A is used. As shown in the drawing, a photographing optical path is bent as much as 90 degrees by the optical path bending prism P disposed in the first lens unit G1. Therefore, portions disposed after the prism P of the first lens unit G1, and the second lens unit G2 to the fourth lens unit G4 are arranged substantially along a parallel direction to the front surface of the digital camera. Therefore, the digital camera can be thinned. Even when another example of the zoom lens system according to the present invention is used, an effect can similarly be obtained. It is to be noted that, if necessary, the optical path may be bent at an angle other than 90°.

An image of an object to be photographed by the photographing optical system 141 is formed on an image surface I via a low pass filter F and a cover glass C provided with a wavelength band restrictive (near infrared cutting) coating. An image pickup surface (a photoelectric conversion surface)

of a CCD image sensor 149 is disposed on the image surface I. The object image received by this CCD image sensor 149 is displayed as an electronic image in the liquid crystal display monitor 147 provided at a back surface of the camera via processing means 151. The processing means 151 is connected to recording means 152, and the photographed electronic image can be recorded. It is to be noted that this recording means 152 may be integrated with the processing means 151, or the means may separately be arranged. As the recording means, a memory or a hard disk drive (HDD) incorporated in the digital camera may be used, or an HDD, a memory card, a DVD or the like detachably attached to the digital camera may be used.

Furthermore, an objective optical system 153 for the finder is disposed along the optical path 144 for the finder. The object image is formed by this objective optical system 153 for the finder on a view field frame 157 of a Porro prism 155 as an image erecting member. Behind this Porro prism 155, an eyepiece optical system 159 is disposed which guides an erected image into an observer's eyeball E. Cover members 150 are disposed on an incidence side of the photographing optical system 141 and the objective optical system 153 for the finder and an emission side of the eyepiece optical system 159.

It is to be noted that in an example of FIG. 11, parallel flat plates are arranged as the cover members 150, but lenses having powers may be used. Alternatively, the plates may be omitted.

Figure 12:
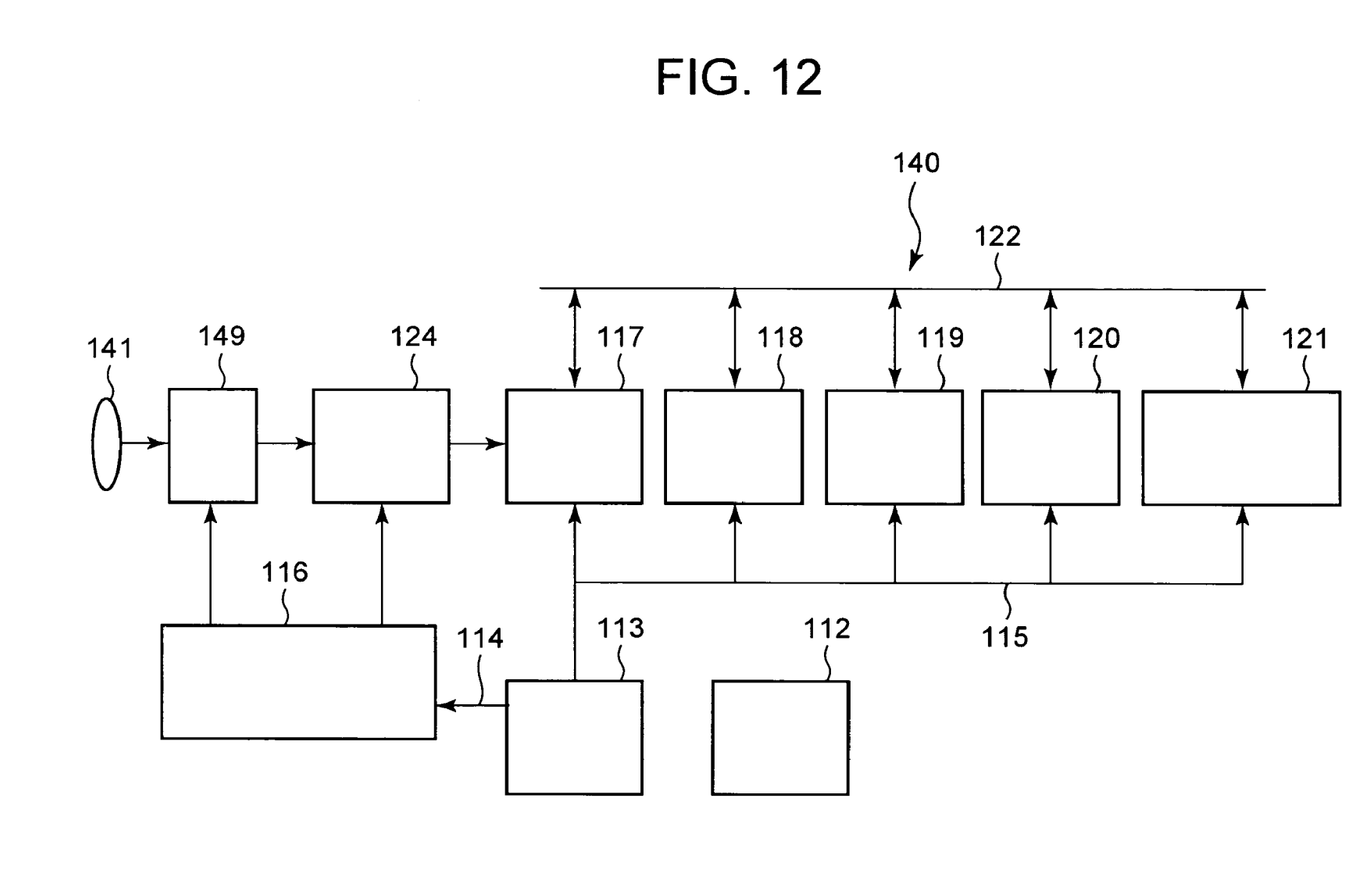
FIG. 12 is a block diagram showing a main part of an inner circuit of the digital camera shown in FIG. 9.

FIG. 12 is a block diagram of a main part of an internal circuit of the digital camera 140. It is to be noted that in the following description, the processing means includes, for example, a CDS/ADC section 124, a temporary storage memory 117, an image processing section 118 and the like, and recording means includes a storage medium section 119 and the like.

As shown in FIG. 12, the digital camera 140 includes an operating section 112, a control section 113 connected to this operating section 112, and an image pickup driving circuit 116, the temporary storage memory 117, the image processing section 118, the storage medium section 119, a display section 120 and a setting information storage memory section 121 which are connected to a control signal output port of the control section 113 via buses 114 and 115.

The temporary storage memory 117, the image processing section 118, the storage medium section 119, the display section 120 and the setting information storage memory section 121 are constituted so that they can input or output data with respect to one another via a bus 122. The image pickup driving circuit 116 is connected to the CCD image sensor 149 and the CDS/ADC section 124.

The operating section 112 includes various input buttons and switches such as the shutter release button, and transmits, to the control section, event information input from the outside (a camera user) via these input buttons and switches.

The control section 113 includes a central processing unit (CPU) and the like. The section is a circuit in which a program memory (not shown) is incorporated and which controls the whole digital camera 140 in response to an instruction command input from the camera user via the operating section 112 in accordance with a program stored in the program memory.

The CCD image sensor 149 receives the object image formed via the photographing optical system 141. The CCD image sensor 149 is an image pickup device which is driven and controlled by the image pickup driving circuit 116 and which converts, into an electric signal, a light quantity of the object image for each pixel to output the signal to the CDS/ADC section 124.

The CDS/ADC section 124 is a circuit which amplifies the electric signal output from the CCD image sensor 149 and which subjects the signal to analog/digital conversion to output, to the temporary storage memory 117, video bare data (hereinafter referred to as the raw data) simply subjected to the amplification and digital conversion.

The temporary storage memory 117 is a buffer including, for example, an SDRAM and the like, and is a memory device in which the raw data output from the CDS/ADC section 124 is temporarily stored. The image processing section 118 is a circuit which reads the raw data stored in the temporary storage memory 117 or the storage medium section 119 to subject the data to various electric image processing including distortion correction based on an image quality parameter designated by the control section 113.

The storage medium section 119 is a control circuit of, for example, an apparatus to which a card or stick type recording medium including a flash memory and the like is detachably attached and in which the raw data transferred from the temporary storage memory 117 and image data subjected to image processing by the image processing section 118 are recorded and retained in the card or stick type flash memory.

The display section 120 includes a liquid crystal display monitor, and the section includes a circuit to display an image, an operation menu and the like in the liquid crystal display monitor.

The setting information storage memory section 121 includes an ROM section in which various image quality parameters are stored beforehand, an RAM section to store the image quality parameter selected from the image quality parameters read from the ROM section by an input operation of the operating section 112. The setting information storage memory section 121 includes a circuit which controls input/output with respect to these memories.

The digital camera 140 constituted in this manner has a large angle of view of the photographing optical system 141 in the wide-angle end, is small-sized, has a high zoom ratio and has an image forming performance stabilized in the whole zoom region.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
   a first lens unit having a positive refractive power;
   a second lens unit having a negative refractive power;
   a third lens unit having a positive refractive power;
   a fourth lens unit having a positive refractive power; and
   an aperture stop disposed between the second lens unit and the third lens unit,
   during zooming from a wide-angle end to a telephoto end, each space between the lens units which are arranged adjacent to each other being changed,
   the first lens unit comprising, in order from the object side,
      a negative lens as a single lens having a negative refractive power, a reflective optical element having a reflective surface which reflects an optical path, and a sub unit having a positive refractive power, the following conditions (1), (2) and (3) being satisfied:

$$n_{dL1} > 1.95 \quad (1);$$

$$v_{dL1} < 26 \quad (2); \text{ and}$$

$$0.5 < D_{13}/f_1 < 1.5 \quad (3),$$

in which $n_{dL1}$ is a refractive index of the negative lens of the first lens unit closest to the object side for the d-line, $v_{dL1}$ is the Abbe number of the negative lens of the first lens unit closest to the object side, $D_{13}$ is a distance along an optical axis between an image-side surface of the negative lens of the first lens unit closest to the object side and an object-side surface of the sub unit having the positive refractive power, and $f_1$ is a focal length of the first lens unit.

2. The zoom lens system according to claim 1, wherein the third lens unit comprises, in order from the object side, a first positive lens, a second positive lens and a cemented lens constituted by cementing a positive lens and a negative lens in order from the object side.

3. The zoom lens system according to claim 2, wherein the first positive lens and the second positive lens of the third lens unit satisfy the following conditions:

$$-0.95 < (R_1 + R_2)/(R_1 - R_2) < -0.5 \quad (4); \text{ and}$$

$$-0.3 < (R_3 + R_4)/(R_3 - R_4) < 0.3 \quad (5),$$

in which $R_1$ is a paraxial radius of curvature of an object-side surface of the first positive lens, $R_2$ is a paraxial radius of curvature an image-side surface of the first positive lens, $R_3$ is a paraxial radius of curvature of an object-side surface of the second positive lens, and $R_4$ is a paraxial radius of curvature of an image-side surface of the second positive lens.

4. The zoom lens system according to claim 2, wherein the first positive lens and the second positive lens of the third lens unit satisfy the following condition:

$$0.7 < P_{31}/P_{32} < 1.8 \quad (6),$$

in which $P_{31}$ is a focal length of the first positive lens, and $P_{32}$ is a focal length of the second positive lens.

5. The zoom lens system according to claim 1, wherein the negative lens of the first lens unit closest to the object side is a negative meniscus lens whose concave surface faces the image side, and an image-side surface of the negative meniscus lens is an aspherical surface.

6. An electronic image pickup apparatus comprising:
the zoom lens system according to claim 1; and
an electronic image pickup device which is disposed on an image side of the zoom lens system and which converts an optical image into an electric signal.

7. The electronic image pickup apparatus according to claim 6, further comprising:
a circuit which calculates and processes the electric signal from the electronic image pickup device and which electrically corrects a distortion generated in the zoom lens system.

8. The zoom lens system according to claim 1, which is constituted as a four-unit zoom lens system.

9. The zoom lens system according to claim 1, wherein
the sub unit is constituted as a positive single lens, and
a total number of optical elements included in the first lens unit is three of the negative lens the optical path reflective optical element and the positive single lens.

10. The zoom lens system according to claim 1, wherein the second lens unit comprises, in order from the object side, a negative lens component and a commented lens component constituted by cementing a positive lens and a negative lens.

11. The zoom lens system according to claim 10, wherein a total number of lens components included in the second lens unit is two.

12. The zoom lens system according to claim 11, wherein a total number of lens elements included in the second lens unit is three.

13. The zoom lens system according to claim 1, wherein the fourth lens unit comprises a positive lens component having an aspherical lens surface, and a total number of lens components included in the fourth lens unit is one.

* * * * *